(12) United States Patent
Vasseur et al.

(10) Patent No.: US 11,283,830 B2
(45) Date of Patent: Mar. 22, 2022

(54) PROTECTING DEVICE CLASSIFICATION SYSTEMS FROM ADVERSARIAL ENDPOINTS

(71) Applicant: Cisco Technology, Inc., San Jose, CA (US)

(72) Inventors: Jean-Philippe Vasseur, Saint Martin d'Uriage (FR); Grégory Mermoud, Veyras VS (CH); Pierre-André Savalle, Rueil-Malmaison (FR); David Tedaldi, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 16/823,650

(22) Filed: Mar. 19, 2020

(65) Prior Publication Data
US 2021/0297442 A1    Sep. 23, 2021

(51) Int. Cl.
*H04L 29/06* (2006.01)

(52) U.S. Cl.
CPC ...... *H04L 63/1441* (2013.01); *H04L 63/0263* (2013.01); *H04L 63/1458* (2013.01); *H04L 63/1466* (2013.01); *H04L 2463/142* (2013.01)

(58) Field of Classification Search
CPC ............. H04L 63/1441; H04L 63/0263; H04L 63/1458; H04L 63/1466; H04L 2463/142
See application file for complete search history.

(56) References Cited

U.S. PATENT DOCUMENTS

| | | | |
|---|---|---|---|
| 8,813,236 B1 | 8/2014 | Saha et al. | |
| 10,462,171 B2 | 10/2019 | Weingarten et al. | |
| 2007/0016945 A1* | 1/2007 | Bassett | H04L 63/0263 726/11 |
| 2009/0262741 A1* | 10/2009 | Jungck | H04L 61/1511 370/392 |
| 2014/0282855 A1* | 9/2014 | Clark | H04L 63/20 726/1 |
| 2017/0171231 A1* | 6/2017 | Reybok, Jr. | H04L 63/1433 |
| 2017/0279698 A1* | 9/2017 | Sartran | H04L 41/142 |
| 2017/0279828 A1* | 9/2017 | Savalle | H04L 41/142 |
| 2017/0279829 A1* | 9/2017 | Vasseur | H04L 63/1425 |
| 2019/0014137 A1* | 1/2019 | Du | H04L 63/20 |

(Continued)

OTHER PUBLICATIONS

Feinstein, et al., "Statistical approaches to DDoS attack detection and response", Proceedings DARPA Information Survivability Conference and Exposition, Apr. 2003, 12 pages, IEEE.

(Continued)

*Primary Examiner* — Aftab N. Khan
(74) *Attorney, Agent, or Firm* — Behmke Innovation Group LLC; Kenneth J. Heywood; Jonathon P. Western

(57) ABSTRACT

In various embodiments, a device classification service clusters devices in a network into a device type cluster based on attributes associated with the devices. The device classification service tracks changes to the device type cluster over time. The device classification service detects an attack on the device classification service by one or more of the devices based on the tracked changes to the device type cluster. The device classification service initiates a mitigation action for the detected attack on the device classification service.

20 Claims, 9 Drawing Sheets

BEFORE ATTACK

AFTER ATTACK

(56) References Cited

U.S. PATENT DOCUMENTS

2019/0215329 A1 7/2019 Levy
2019/0306731 A1 10/2019 Raghuramu et al.

OTHER PUBLICATIONS

Goodfellow, et al., "Explaining and harnessing adversarial examples", online: https://arxiv.org/pdf/1412.6572.pdf, International Conference on Learning Representations (2015), 11 pages.
Wang, et al., "A new multistage approach to detect subtle DDoS attacks", Mathematical and Computer Modelling, vol. 55, Issue 1-2, Jan. 2012, pp. 198-213, Elsevier.

* cited by examiner

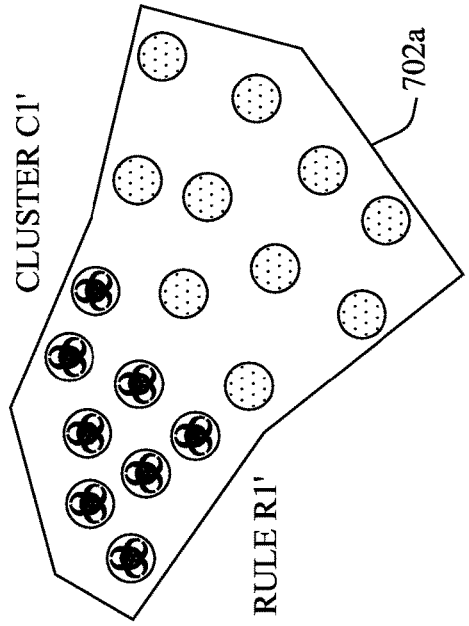
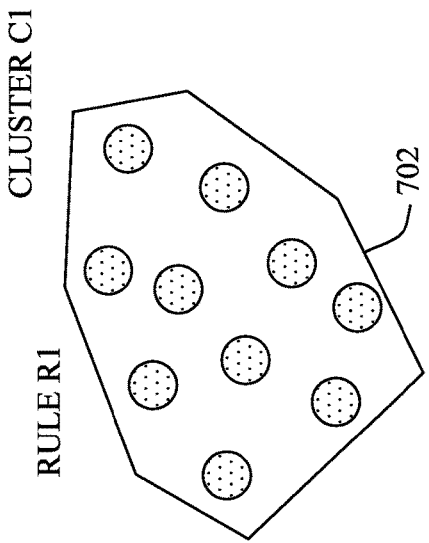
FIG. 7

PROTECTING DEVICE CLASSIFICATION SYSTEMS FROM ADVERSARIAL ENDPOINTS

TECHNICAL FIELD

The present disclosure relates generally to computer networks, and, more particularly, to protecting device classification systems from adversarial endpoints.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute) and applying a device classification rule to the observed behavior.

Unfortunately, device classification systems are not immune to attacks by adversarial/malicious endpoints in a network. For example, in a distributed denial of service (DDoS) attack, a set of endpoints may spoof different attributes over time in an attempt to overwhelm the classification system. In another example attack, adversarial endpoints may spoof different attributes, but in a subtle way, to contaminate the database used by the system to classify devices. In further cases, both types of attacks can be used in concert with one another (e.g., launching a DDoS attack to mask efforts to pollute the database of the device classification system).

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example of the effects of an adversarial attack on a device type cluster.

DESCRIPTION OF EXAMPLE EMBODIMENTS

Overview

Figure 1A:
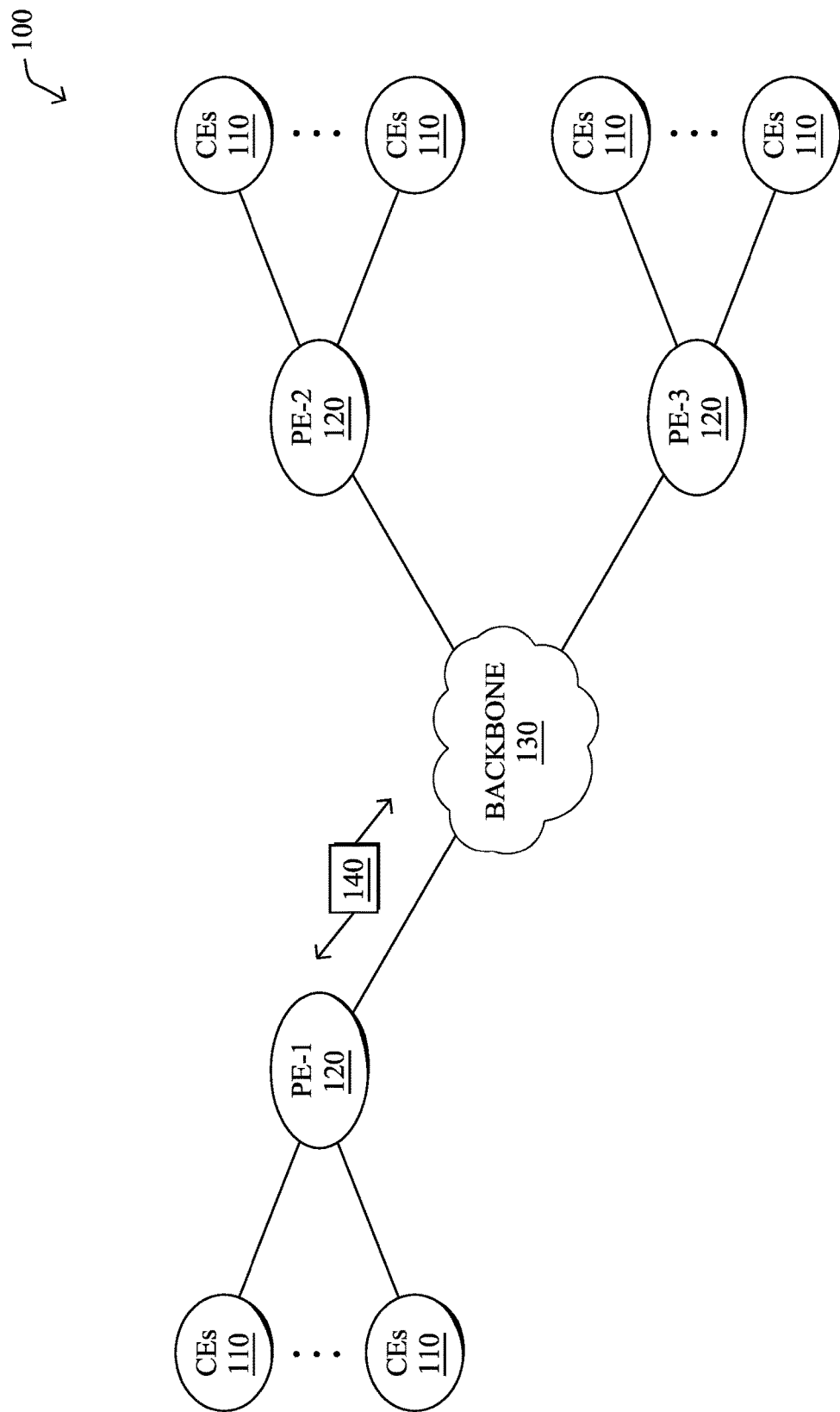
FIGS. 1A-1B illustrate an example communication network.

According to one or more embodiments of the disclosure, a device classification service clusters devices in a network into a device type cluster based on attributes associated with the devices. The device classification service tracks changes to the device type cluster over time. The device classification service detects an attack on the device classification service by one or more of the devices based on the tracked changes to the device type cluster. The device classification service initiates a mitigation action for the detected attack on the device classification service.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
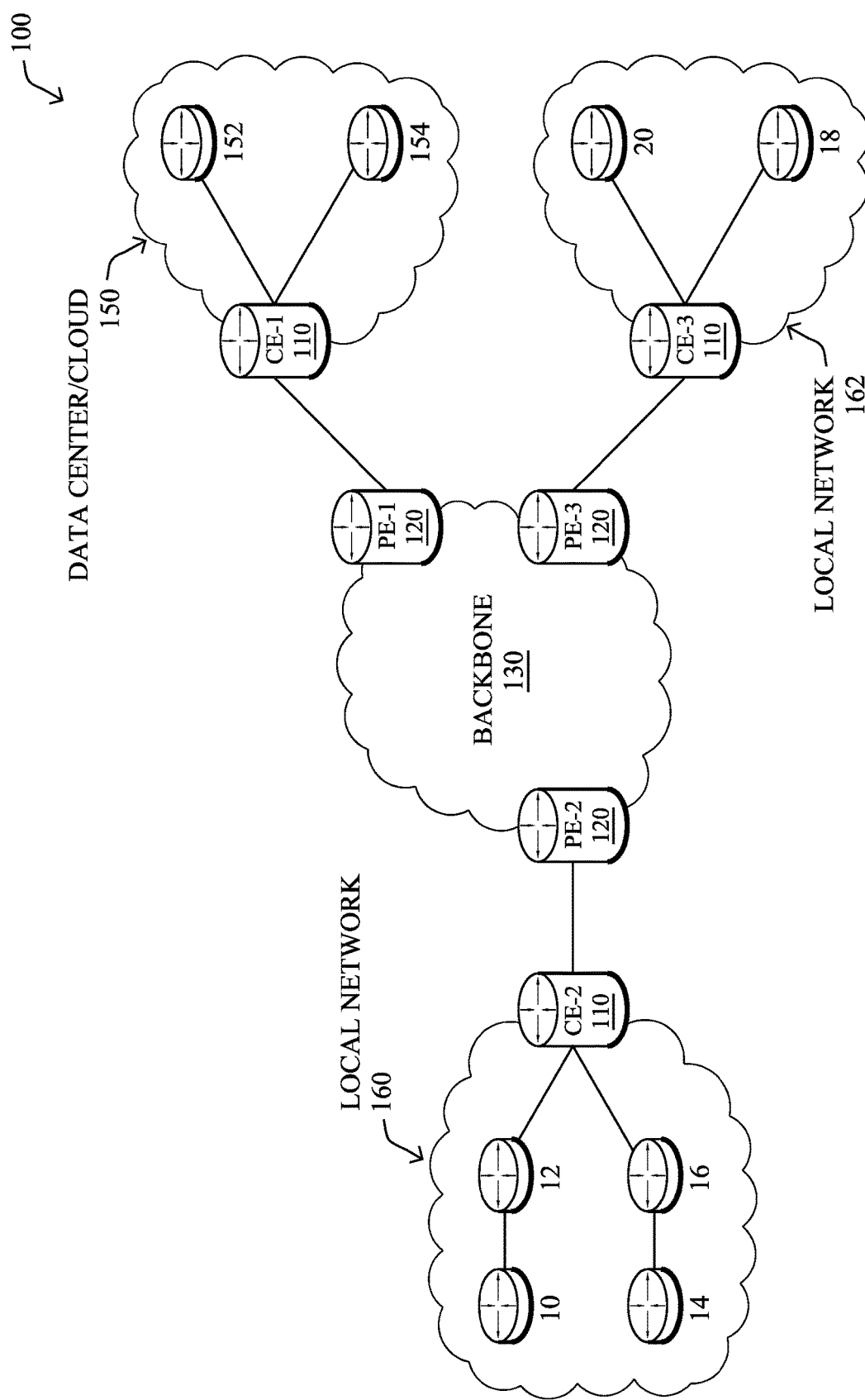

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
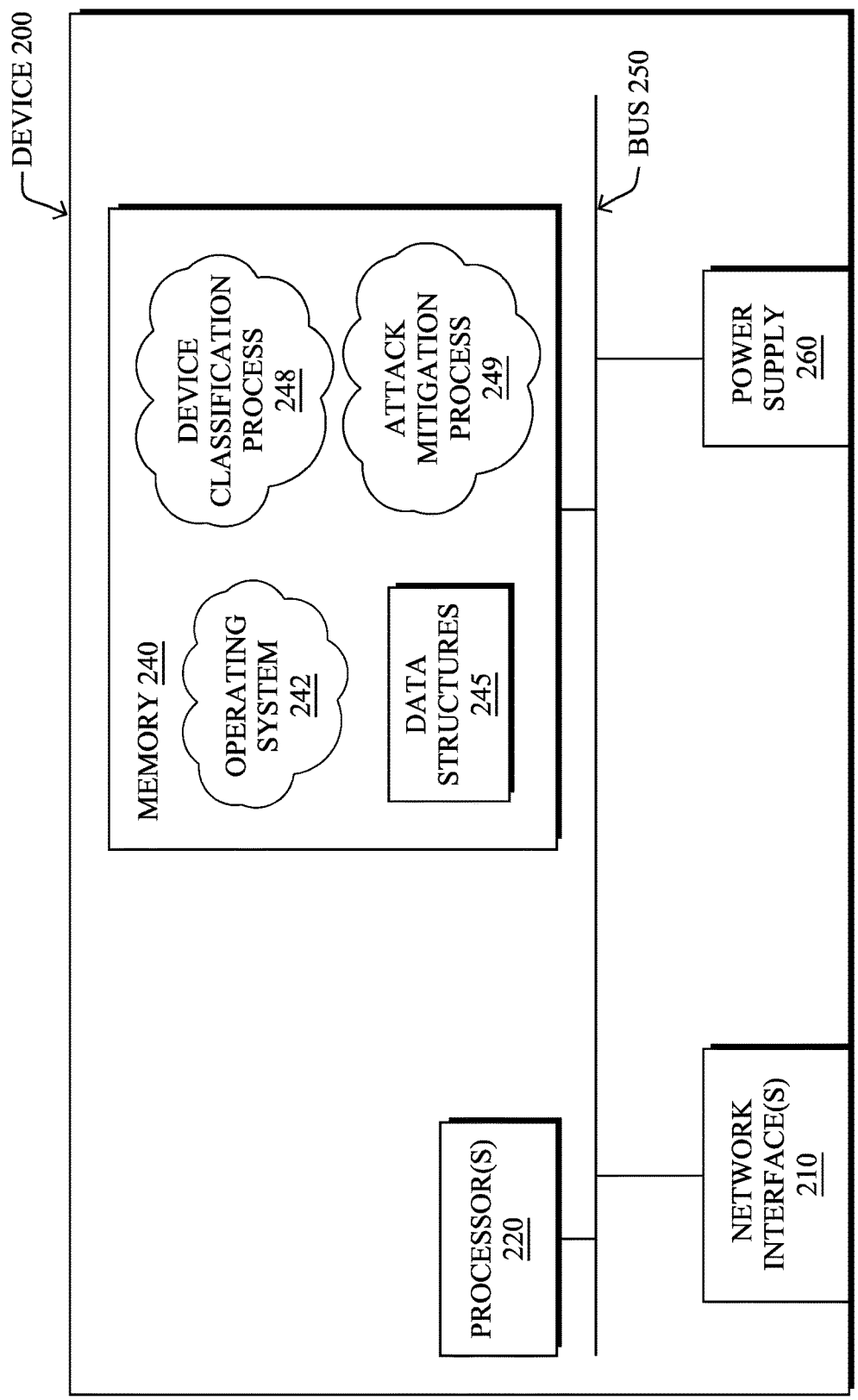
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or an attack mitigation process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
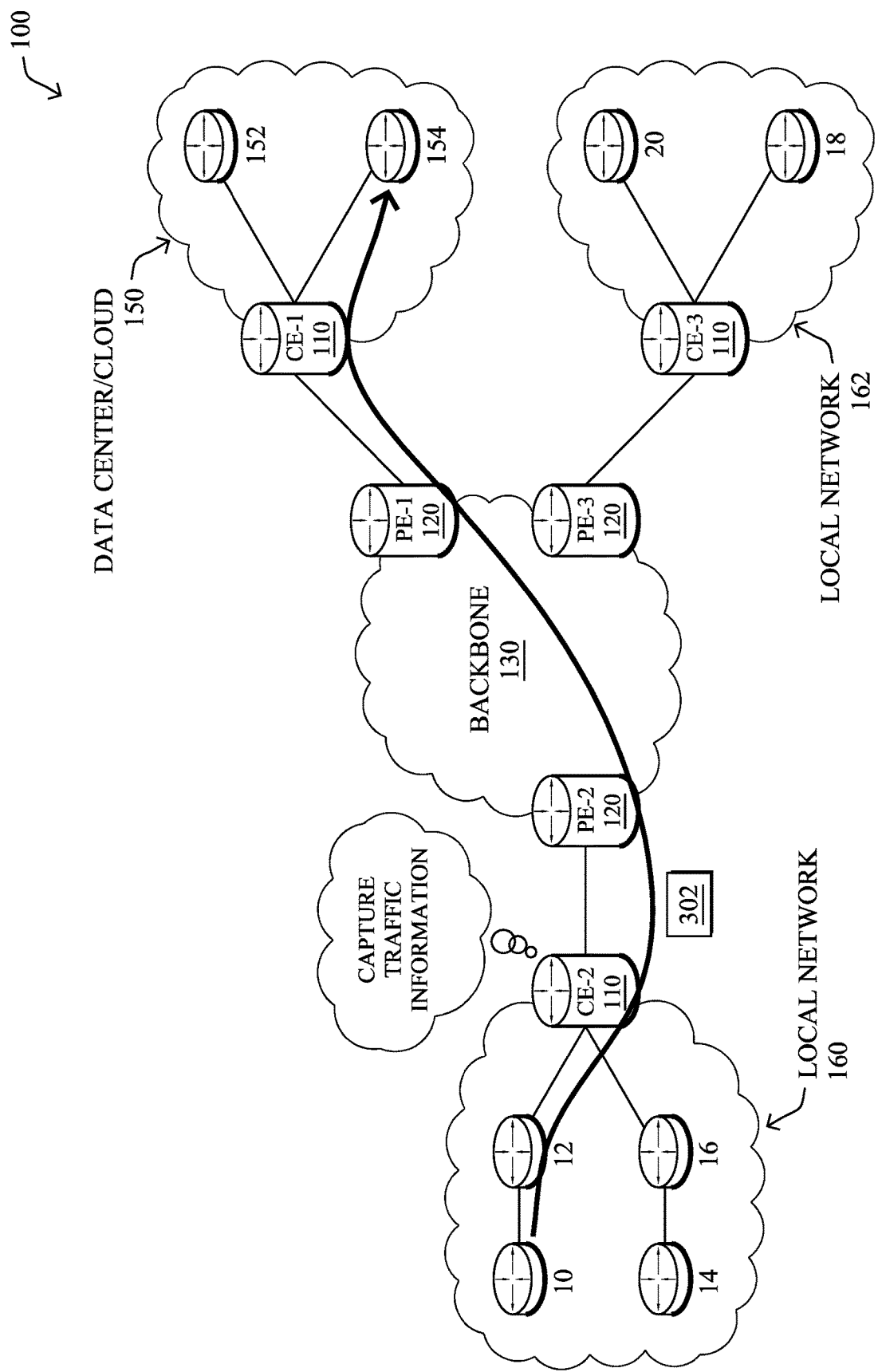
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
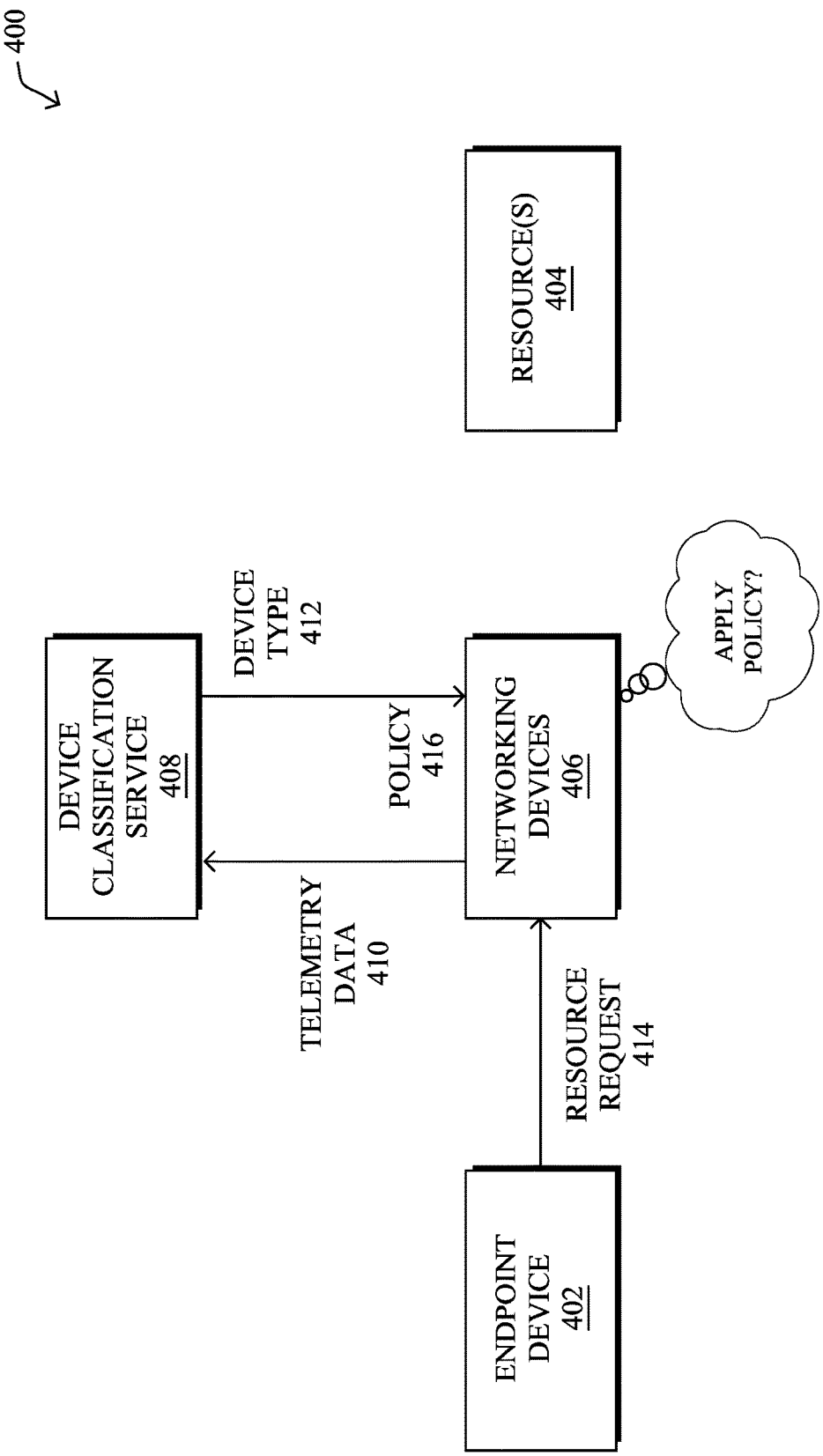
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. Service 408 may, for example, be provided through the execution of device classification process 248, described above (e.g., in conjunction with attack mitigation process 249). In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
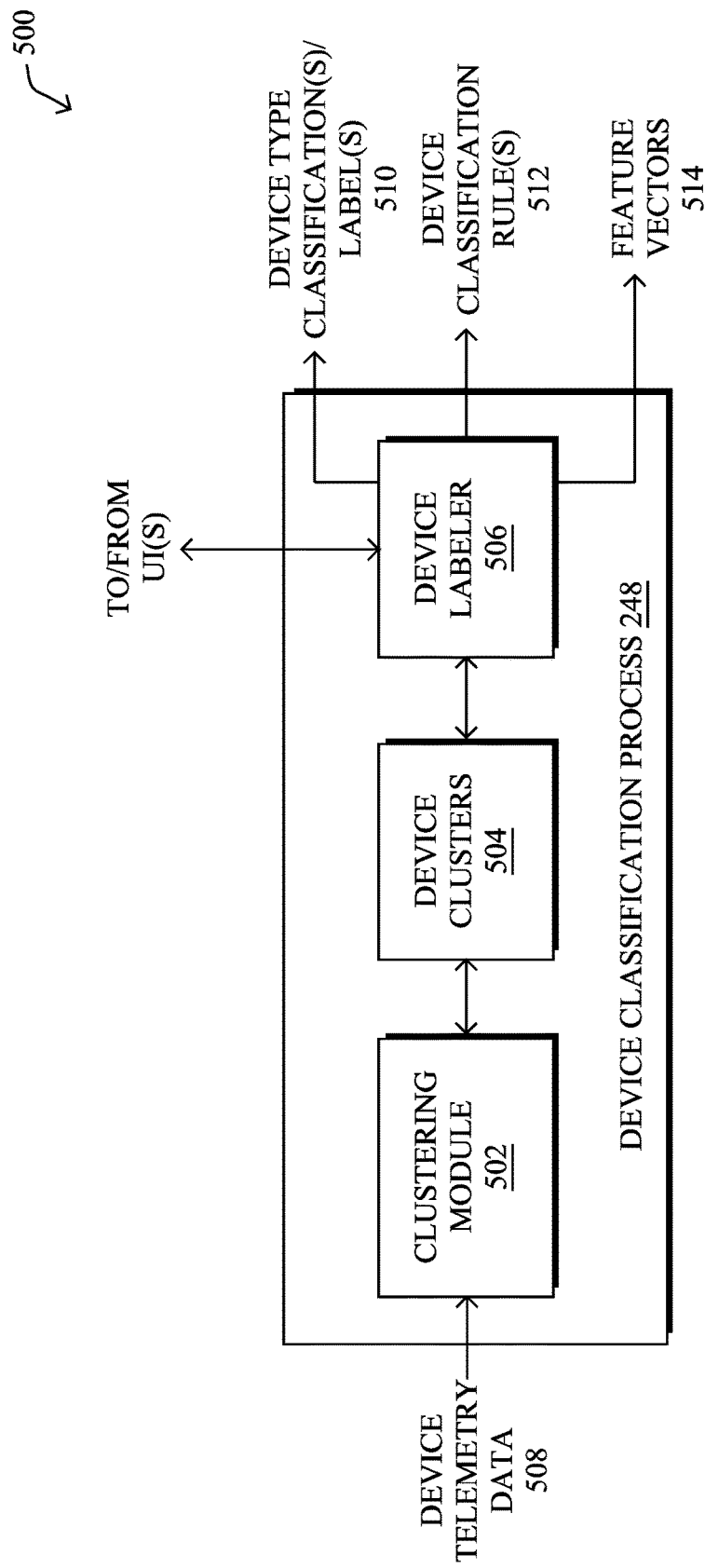
FIG. 5 illustrates an example architecture for a device classification process.

FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification/label 510 for a device under scrutiny, thereby allowing the receiving entity to apply network policies to the device, based on its device type classification(s)/label(s) 510. For example, one such network policy may cause a networking device to prevent an MRI machine from accessing the Internet or another resource via the network.

In various embodiments, the components 502-506 of device classification process 248 may leverage active learning, to assign device type classification(s)/label(s) 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification 510. In cases in which device labeler 506 is unable to classify the cluster 504 with sufficient confidence, it may send a label request to a user interface (UI), seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification/label 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508, represented as positive and negative feature vectors 514, and the device type labels obtained from experts through active learning. For example, device labeler 506 may aggregate the labels obtained from the experts, to form a finalized device type classification label 510 for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks. etc.

For purposes of illustration, a device classification rule 512 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc.

As noted above, device identification is without any doubt a major and critical component of any secure network access solution. For example, the Identification Service Engine (ISE) by Cisco Systems, Inc., is used in a network to apply policies to different devices in a network and implement various forms of micro-segmentation in a network, based on the different types of the devices. While this approach can greatly improve the security of the network, protecting the device classification service from adversarial attacks also becomes a key requirement for the infrastructure. In general, these types of attacks fall into either or both of the following categories:

Distributed Denial of Service (DDoS) attacks: in this type of attack, one or more endpoint devices may spoof different combinations of attributes at a very fast pace, thus causing the device classification service to form many new device type clusters in an attempt to: 1.) overwhelm the system trying to build new rules for those device types and/or 2.) overwhelm the user with new candidate clusters to label. Such an attack can also be amplified by the adversarial endpoint(s) spoofing MAC addresses, to 'trick' the device classification system into believing that the flood of data comes from more endpoints than in actuality. In addition, this type of attack can also flood the on-prem device classification rule evaluation mechanism itself, although this may be easier to prevent using classical techniques such as simple rate limiting.

Database contamination: in this type of attack, one or more endpoint devices may spoof a given combination of attributes at different points in time, typically in a very subtle fashion so as to escape detection, thus leading to a new device type cluster that looks legitimate, but is not. Such an illegitimate device type cluster can lead to misclassifications and can render the cluster review process unusable, if too many bad clusters are presented for device type labeling. In cases in which the device classification service serves multiple networks, this can affect both the network in which the attack is performed, as well as on the larger set of networks. As a consequence, this can have effects both on the operation of the source network where the attack is done, as well as on the larger pool of networks. Note that the objective of such an attack is to compromise the efficacy of the device classification service itself, not to obtain different access rights on the network by spoofing device attributes, as in the case of a DDoS attack.

Note also that the above attack types can also be launched in conjunction with one another. For example, a DDoS attack may be launched in an effort to conceal a database contamination attack.

Protecting Device Classification Systems from Adversarial Endpoints

The techniques herein introduce a series of mechanisms that both detect attacks on a device classification service and mitigate such attacks in a fully automated fashion. In various aspects, the techniques herein introduce components whose aim is to detect malicious/adversarial endpoint devices (e.g., devices that are controlled by malicious users, devices infected with malware, etc.), that seek to cause the device classification service to spam experts with illegitimate labeling requests and/or contaminate the knowledge base of the system with spurious rules and replace existing rules with less qualitative rules.

Specifically, according to various embodiments herein, a device classification service clusters devices in a network into a device type cluster based on attributes associated with the devices. The device classification service tracks changes to the device type cluster over time. The device classification service detects an attack on the device classification service by one or more of the devices based on the tracked changes to the device type cluster. The device classification service initiates a mitigation action for the detected attack on the device classification service.

Illustratively, the techniques described herein may be performed by hardware, software, and/or firmware, such as in accordance with device classification process 248 and attack mitigation process 249, which may include computer executable instructions executed by the processor 220 (or independent processor of interfaces 210) to perform functions relating to the techniques described herein.

Operationally, a key observation herein is that DDoS and database contamination attacks can be detected by taking the broader context of the attack into account and ensuring that it is consistent with what is observed from a device classification standpoint. For instance, one clear side effect of any attempt by a few endpoint devices to fake their identities and/or attributes is that the number of unknown endpoint devices in the network will suddenly surge. Similarly, while a malicious device may spoof many key attributes evaluated by the service (e.g., HTTP, DHCP, OUI, etc.), it is very unlikely that the device will be able to do so in a way that is consistent with its overall behavior. For example, such devices are likely to be either abnormally short-lived on the network or exhibit patterns of lateral movement, if the attack is carried out using malware.

Figure 6:
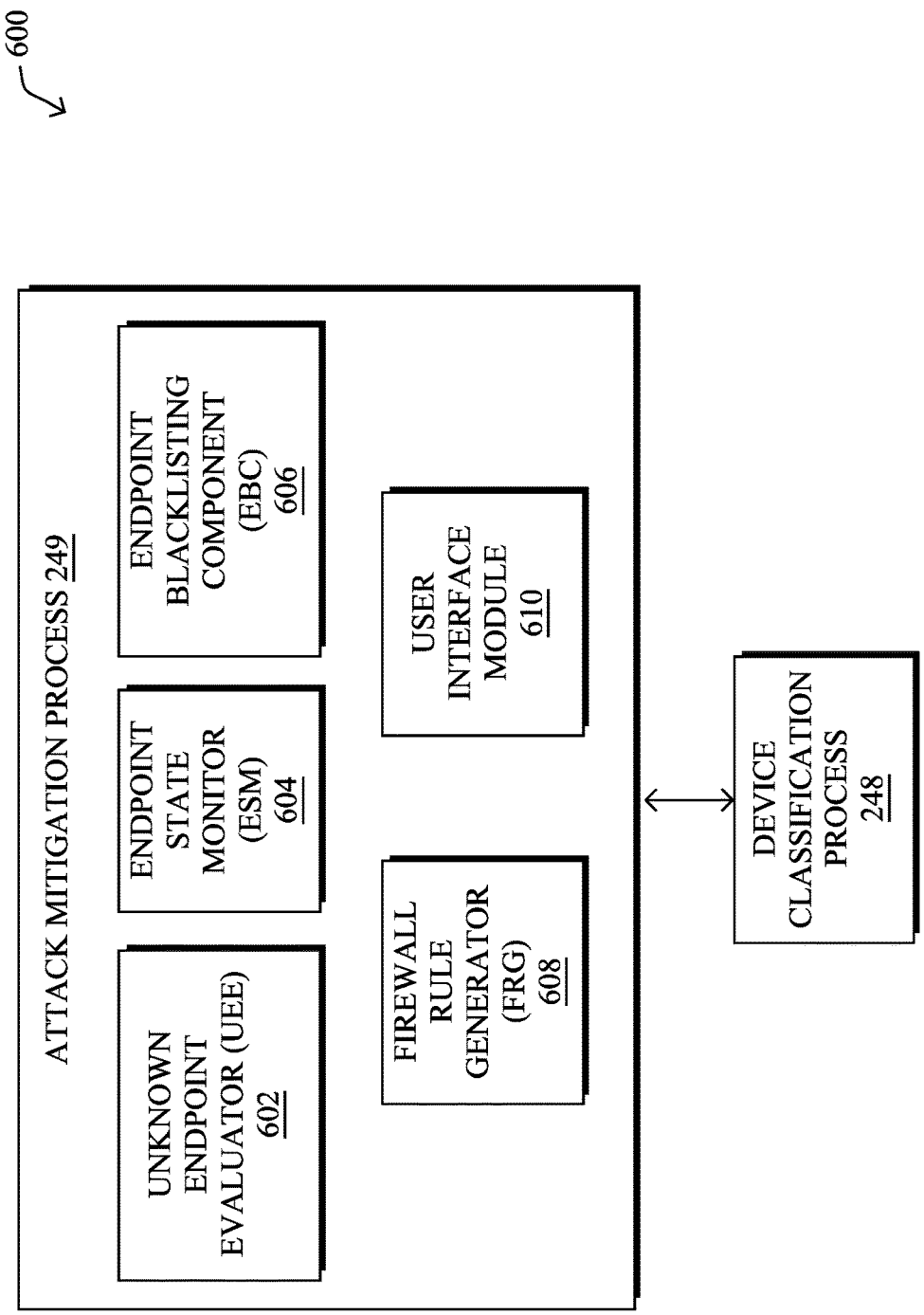
FIG. 6 illustrates an example architecture for mitigating attacks on a device classification service.

FIG. 6 illustrates an example architecture 600 for mitigating attacks on a device classification service, according to various embodiments. As shown, device classification process 248 may operate in conjunction with attack mitigation process 249, to detect attacks on the device classification service provided by process 248 and initiate mitigation actions, when such attacks are detected. While processes 248 and 249 are described herein as separate processes, their functionalities can be combined as part of a single process, in further embodiments. In various embodiments, attack mitigation process 249 may comprise any or all of the following components: an unknown endpoint evaluator (UEE) 602, an endpoint state monitor (ESM) 604, an endpoint blacklisting component (EBC) 606, a firewall rule generator (FRG) 608, and/or a user interface module 610. These components 602-610 may be implemented either on a single device or in a distributed manner, in which case the combined devices may be viewed as a singular device for purposes of implementing the techniques herein. Further, the functionalities of the components of architecture 600 may also be combined, omitted, or implemented as part of other processes, as desired.

According to various embodiments, unknown endpoint evaluator (UEE) 602 may be configured to monitor and analyze the rate of new endpoint devices appearing on the network and, potentially, their locations in the network in which they appear, as well. In various embodiments, UEE 602 may be implemented on-premise, in the cloud, or both, as part of a hybrid implementation.

For example, in the hybrid on-premise and cloud-implemented case, UEE 602 may include a cloud-hosted portion that builds statistical models of the likelihood/probability P(U|C) that a new, unknown endpoint device U will be observed in the network, given a context C. Such a context may be represented as a vector that describes different attributes of the device (e.g., the protocols that it uses, other device behaviors, etc.), the current state of the network, and/or a recent history of the state of the network. In particular, C may indicate the rate of new devices appearing on the network at different locations, the breakdown of device types in the specific location in which device U appeared, etc.

In turn, the cloud-hosted portion of UEE 602 may provide its models to an on-premise portion in the local network for evaluation. In some embodiments, these models may take the form of anomaly detectors that assign a trust index to every new endpoint device that appears on the network. In other words, the models may first be trained in the cloud using a large dataset of prior network observations (e.g., a history of devices appearing in the network and/or across multiple networks) to predict the likelihood of a given device being legitimate versus attempting to compromise the device classification service.

As would be appreciated, UEE 602 can also be implemented strictly in the cloud by passing all relevant data from the network under observation to UEE 602. Alternatively, UEE 602 may be implemented solely in the network under observation.

In a simple embodiment, UEE 602 may detect DDoS attacks on the device classification service/device classification process 248 by assigning low confidence scores/trust indexes to endpoint devices that appear on the network in sudden and/or massive bursts. This is particularly true if those devices are co-located in a specific portion of the network (e.g., in the case of a small set of devices that have physical access to the network in a specific location). In this simple case, the model generated and used by UEE 602 may take the form of a simple percentile regression to determine the acceptable threshold on some of the rate of new unknown devices.

More complex data contamination attacks can also be identified by UEE 602 based on the unknown devices appearing with attributes that are inconsistent with their expected attributes, given the networking context. For example, a MAC address associated with an IoT device manufacturer suddenly appearing in a carpeted environment, a lateral movement, or the like, could indicate a database contamination attack on the device classification service. To detect such attacks, UEE 602 could employ a deep auto encoder-based model or the like, in some embodiments.

Endpoint state monitor (ESM) 604 may be responsible for monitoring the long-term evolution of the manifold of a device type cluster formed by device classification process 248. One specific type of database contamination attack consists in causing endpoint devices to exhibit very similar attributes as existing endpoints with the objective of being assimilated into their device cluster, yet sufficiently different to deform the cluster slowly. Doing so can potentially cause device classification process 248 to trigger a retraining of the classification rule associated with the cluster.

By way of example, FIG. 7 illustrates an example 700 of the effects of an adversarial attack on a device type cluster. Prior to the database contamination attack, assume that the device classification service has formed a device cluster C1 of legitimate endpoints, based on these endpoint devices exhibiting similar network attributes. In turn, the classification service may associate a device type label with cluster C1 and may generate a classification rule R1 that can be used to quickly assign the device type label to new devices.

During the database contamination attack on the device classification service, adversarial endpoints may mimic the attributes of the legitimate ones, except for a few minor variations in their attributes. As a result, the service may add these adversarial endpoint devices to cluster C1, thereby morphing cluster C1 into C1' and changing its manifold 702 into manifold 702a. At some point, the device classification service may determine that rule R1 no longer adequately describes cluster C1' and generate a new rule R1'. Note that the outcome of this form of attack is that the new rule R1' will be of lower quality (e.g., less specific) and may even reach the point of being too course, causing devices to be incorrectly matched to the rule. When this occurs, devices will be classified with the wrong device type and associated with the wrong policy, thus creating security concerns.

Referring again to FIG. 6, ESM 604 may the evolution of all device type clusters generated by device classification process 248, to ensure that the clusters have been stable in the past and do not start growing, unexpectedly. In particular, if this growth is driven by a certain subset of devices (e.g., those in a particular network, network location, etc.), this could be a clear indication that a database contamination attack is underway. To do so, in on embodiment, ESM 604 may use a series of heuristics to assign a trust index to each new endpoint device, similar to the trust indexes assigned by UEE 602. In more complex embodiments, ESM 604 may compute a trust index for an endpoint device using a statistical model that evaluates the likelihood of an addition to a device type cluster based on a variety of input features such as the size of the cluster, the number of networks in which the devices in the cluster are located, when a device was last added to the cluster, etc.

ESM 604 may also monitor the creation of new device type clusters by device classification process 248 to detect attacks, in further embodiments. In particular, ESM 604 may evaluate the rate and speed of creation of any new device cluster by device classification process 248. Indeed, some attacks may consist in causing the classification service to create a very compact cluster quite rapidly, especially if the attack is driven by malware that has infected a very large number of devices. In one embodiment, ESM 604 may employ an anomaly detection model to identify when the evolution of a cluster formed by device classification process 248 is anomalous/suspicious.

The ESM may also monitor the creation of new clusters, in particular, the rate and speed of creation. The attack may consist in creating a very compact cluster quite rapidly (especially if driven by a malware that has infected a very large number of devices worldwide). Using AD techniques, one could detect situations where a cluster evolution is suspicious.

One mitigation action that ESM 604 may initiate when it detects a potential attack on the device classification service is to prevent device classification process 248 from performing any rule re-training for the affected cluster(s). In other words, if ESM 604 determines that a particular device type cluster formed by device classification process 248 is evolving in an anomalous way, it may signal device classification process 248 to freeze the classification rule associated with that cluster (e.g., until an expert has been given the opportunity to evaluate the changes, etc.).

Endpoint blacklisting component (EBC) 606 may also be configured to initiate further mitigation actions when UEE 602 or ESM 604 detect an attack on the device classification service. In some cases, EBC 606 may be implemented as a cloud service that receives receive endpoint device attributes from any number networks and write them to a data lake. The role of EBC 606 to protect both the network in which the attack originated, as well as any other networks that use the device classification service. More specifically, EBC 606 may use the trust indexes computed by UEE 602 and ESM 604 to flag a particular endpoint device as 'trusted' or 'untrusted.' When an endpoint device is trusted, its associated data may be stored by the device classification service and processed according to its priority.

In one embodiment, when EBC 606 flags an endpoint device as untrusted, EBC 606 may cause the data associated with that device to be blacklisted, meaning that it is either: 1.) stored in a best-effort fashion or in low-cost storage by device classification process 248 or 2.) dropped upon reception.

In a further embodiment, when EBC 606 flags a particular endpoint device as untrusted, it may cause device classification process 248 to flag any clusters or rules created based on that device to be marked as untrusted, as well. When this occurs, the classification service may stop presenting such clusters and/or rules to experts for evaluation. Doing so prevents the untrusted endpoint devices from leading to crowd-sourced suggestions being presented until the situation has been resolved.

In addition, once EBC 606 has flagged a given endpoint device as untrusted, device classification process 248 may either revert that device to its prior device type classification until reviewed by an expert or, alternatively, classify the device with an 'untrusted' type label. This behavior can be made configurable by the network operator, in some implementations. By assigning an 'untrusted' device type label to the endpoint device, which may differ from the 'unknown' device type label, specific network policies can be applied to the endpoint device (e.g., by quarantining the endpoint device, restricting its access to the network, etc.). Of course, the device can be returned to its original classification upon user review by an expert.

Once a device classification rule has been marked as untrusted, it may only be returned to a trusted state (e.g., where it can be used for crowdsourcing) after review by an operational team that may span the various networks that use the classification service. In one embodiment, the service may employ crowdsourcing to check whether a given situation is indeed adversarial or not. Such rules can then be deployed to one or more network firewalls either automatically or after confirmation from the network operator.

User interface module 610 may interact with EBC 606 and FRG 608 to present alerts to a network operator/expert, when one or more endpoint devices are flagged as untrusted. For example, such an alert may indicate the suspicious endpoint, as well as any contextual information about that device, in a manner that is similar to the active labeling workflow employed by the classification service to obtain device type labels. In addition, the alert from user interface module 610 may also include more specific information regarding the rationale for the suspicious. For example, the alert may also show a timeline of the appearance of new unknown endpoints on the network, the deformation of a device cluster (e.g., similar to example 700 in FIG. 7), indicate attributes of the untrusted device that is inconsistent with the rest of its cluster, combinations thereof, or the like.

In some case, the alert generated by user interface module 610 may cover a large number of endpoint devices at once, when similar events are detected around similar times so that this workflow cannot be made unusable by triggering a lot of adversarial endpoints or clusters. Similarly, user interface module 610 may not display all of the untrusted endpoint devices if there are many of them (e.g., above a threshold number), to avoid any form of bottleneck with the reviewing user(s). To this end, EBC 606 may group the untrusted endpoints in a time window, either in one single group or in a few more precise groups (e.g., based on whether the endpoint is mostly untrusted by UEE 602, by ESM 604, or both, which would correspond to different types of events).

The alert presented by user interface module 610 may also display potential firewall rules generated by FRG 608 that would be allowed to block the untrusted endpoint devices, allowing the user to enable one or more of them. In some cases, the user may then approve or reject the decision of EBC 606, thus leading to 1.) a rollback to a previous rule and/or cluster to their state prior to the appearance of the untrusted endpoint device(s), 2.) deployment of a firewall rule generated by FRG 608, if not automatically deployed, and/or 3.) an adjustment to the trust index computation algorithms of UEE 602 and/or ESM 604 (e.g., if the user determines that an endpoint device is indeed trusted), to avoid such blacklisting in the future.

As would be appreciated, architectures 500-600 may be implemented in a variety of ways to support any number monitored networks across any number of different organizations. For example, in one embodiment, device classification may be performed locally in each network and the attack mitigation on the classification services may be performed centrally, such as in the cloud. In such a case, the attack mitigation service may leverage a data lake of data from the various networks, thereby allowing it to propagate mitigation actions (e.g., firewall rules) to any or all of the various networks, as needed.

Figure 8:
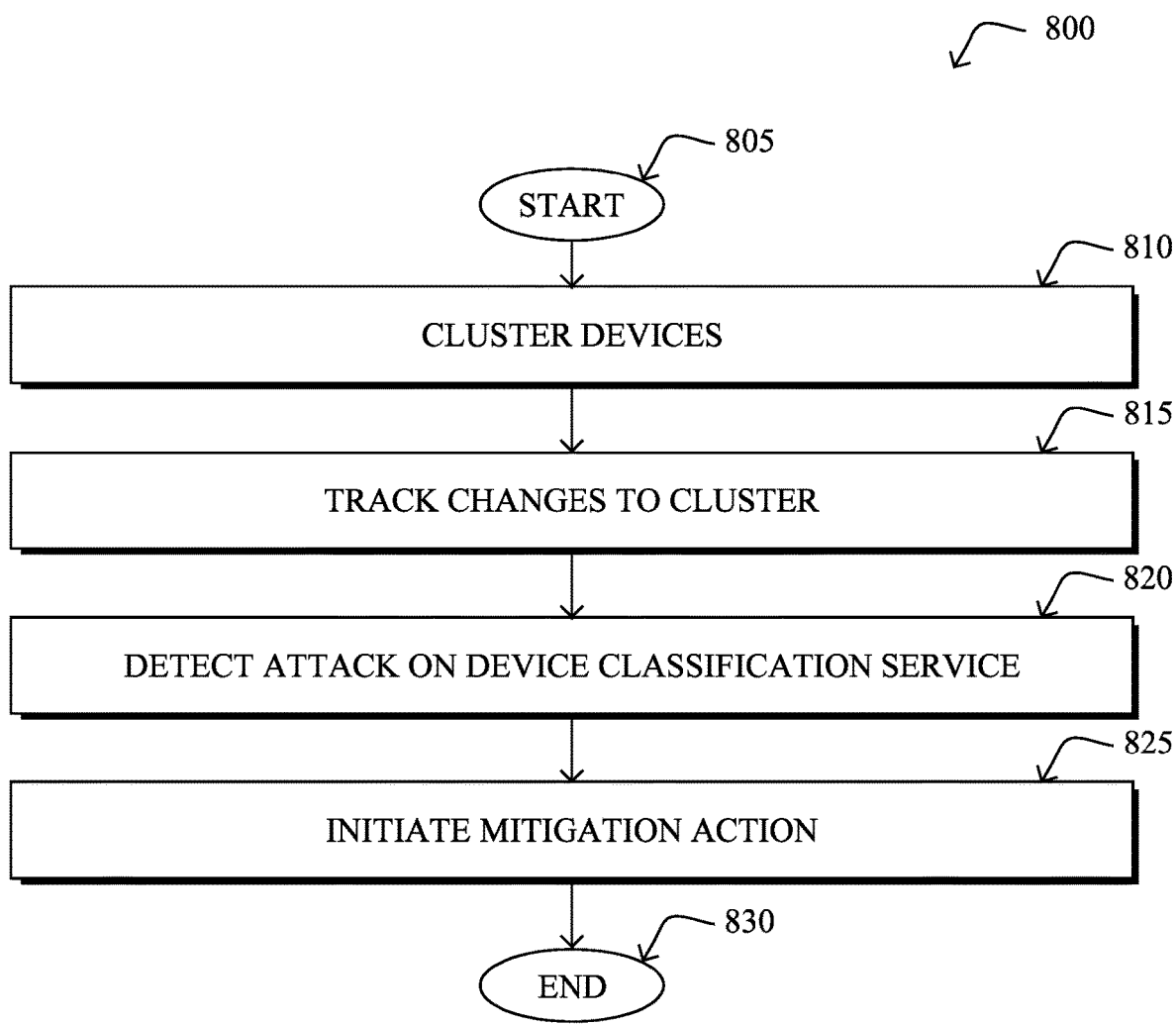
FIG. 8 illustrates an example simplified procedure for protecting a device classification service from adversarial endpoints.

FIG. 8 illustrates an example simplified procedure for protecting a device classification service from adversarial endpoints, in accordance with one or more embodiments described herein. For example, a non-generic, specifically configured apparatus (e.g., device 200) may perform procedure 800 by executing stored instructions (e.g., processes 248, 249), to provide a device classification service to one or more networks. The procedure 800 may start at step 805, and continues to step 810, where, as described in greater detail above, the device classification service may cluster devices in a network into a device type cluster based on attributes associated with the devices. For example, the device classification service may form the cluster by applying clustering to observed attributes of the devices, such their OUIs, HTTP user agents, DHCP parameters, application usages, or any other information that can be gathered about the devices. In turn, the device classification service may associate a device type label with the cluster. In addition, the device classification service may generate a device classification rule based on the attributes of the devices in the cluster and its associated type label.

At step 815, as detailed above, the device classification service may track changes to the device type cluster over time. In various embodiments, the changes may correspond to a burst of devices appearing in the cluster, a rate of change of the cluster, changes in the manifold or attributes associated with the cluster, or the like. In some embodiments, the service may use an anomaly detection model to assign a trust index to a device in the cluster, based on any or all of these tracked changes. In further embodiments, the trust index may also be based in part on how well the attributes of the device match those expected for the device (e.g., a device appearing in a certain location may have expected attributes/behaviors, etc.).

At step 820, the device classification service may detect an attack on the device classification service by one or more of the devices based on the tracked changes to the device type cluster, as described in greater detail above. For example, if the trust index of a particular device is beyond a certain threshold, this may indicate that an attack is underway on the device classification service. Indeed, if the device appears as part of a burst of new devices appearing on the network, is part of a set of devices in the cluster having attributes that change the cluster, or the like, the service may determine that the device is part of an attack and flag the device as untrusted.

At step 825, as detailed above, the device classification service may initiate a mitigation action for the detected attack on the device classification service. In some embodiments, the mitigation action may comprise generating a firewall rule to block one or more devices, a firewall rule to block devices with the attributes of the one or more devices, reverting a device classification rule and/or cluster to a state prior to the attack, or the like. In some embodiments, any mitigation action, as well as the flagging of a particular device as untrusted, may be reviewable or confirmable by a network operator. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help to protect a device classification service from attacks that seek to impede the performance of the classification service. More specifically, the techniques herein are able to detect and mitigate against While there have been shown and described illustrative embodiments that provide for protecting a device classification system from adversarial endpoints, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   clustering, by a device classification service, devices in a network into a device type cluster based on attributes associated with the devices;
   tracking, by the device classification service, changes to the device type cluster over time;
   detecting, by the device classification service, an attack on the device classification service by one or more of the devices based on the tracked changes to the device type cluster; and
   initiating, by the device classification service, a mitigation action for the detected attack on the device classification service.

2. The method as in claim 1, wherein the mitigation action comprises:
   flagging the one or more of the devices as untrusted; and
   obtaining confirmation from a user interface that the one or more of the devices are untrusted.

3. The method as in claim 1, wherein detecting the attack on the device classification service comprises:
   comparing the attributes associated with the devices to expected attributes of the devices.

4. The method as in claim 1, further comprising:
   generating, by the device classification service, a device classification rule based on the device type cluster.

5. The method as in claim 1, wherein the mitigation action comprises generating a firewall rule to block the one or more devices.

6. The method as in claim 5, wherein firewall rule specifies the attributes associated with the one or more devices.

7. The method as in claim 1, further comprising:
using an anomaly detection model to assign a trust index to each of the devices based on their associated attributes; and
determining that the one or more of the devices are associated with the attack based on their assigned trust indexes.

8. The method as in claim 7, wherein the anomaly detection model assigns a low trust index to devices that are added to the cluster in a burst.

9. The method as in claim 7, further comprising:
updating a threshold of the anomaly detection model based on feedback from a user interface.

10. An apparatus, comprising:
one or more network interfaces to communicate with one or more networks;
a processor coupled to the one or more network interfaces and configured to execute one or more processes; and
a memory configured to store a process executable by the processor, the process when executed configured to:
cluster devices in a network into a device type cluster based on attributes associated with the devices, wherein the apparatus uses the device type cluster to provide a device classification service to the one or more networks;
track changes to the device type cluster over time;
detect an attack on the device classification service by one or more of the devices based on the tracked changes to the device type cluster; and
initiate a mitigation action for the detected attack on the device classification service.

11. The apparatus as in claim 10, wherein the mitigation action comprises:
flagging the one or more of the devices as untrusted; and
obtaining confirmation from a user interface that the one or more of the devices are untrusted.

12. The apparatus as in claim 10, wherein the apparatus detects the attack on the device classification service by:
comparing the attributes associated with the devices to expected attributes of the devices.

13. The apparatus as in claim 10, wherein the process when executed is further configured to:
generate a device classification rule based on the device type cluster.

14. The apparatus as in claim 10, wherein the mitigation action comprises generating a firewall rule to block the one or more devices.

15. The apparatus as in claim 14, wherein firewall rule specifies the attributes associated with the one or more devices.

16. The apparatus as in claim 10, wherein the process when executed is further configured to:
use an anomaly detection model to assign a trust index to each of the devices based on their associated attributes; and
determine that the one or more of the devices are associated with the attack based on their assigned trust indexes.

17. The apparatus as in claim 16, wherein the anomaly detection model assigns a low trust index to devices that are added to the cluster in a burst.

18. The apparatus as in claim 16, wherein the process when executed is further configured to:
update a threshold of the anomaly detection model based on feedback from a user interface.

19. A tangible, non-transitory, computer-readable medium storing program instructions that cause a device classification service to execute a process comprising:
clustering, by the device classification service, devices in a network into a device type cluster based on attributes associated with the devices;
tracking, by the device classification service, changes to the device type cluster over time;
detecting, by the device classification service, an attack on the device classification service by one or more of the devices based on the tracked changes to the device type cluster; and
initiating, by the device classification service, a mitigation action for the detected attack on the device classification service.

20. The computer-readable medium as in claim 19, wherein the device type cluster further comprises devices located in one or more other networks, and wherein the mitigation action comprises generating a firewall rule to block the one or more devices and comprises propagating that firewall rule to the network and to the one or more other networks.

* * * * *